(12) United States Patent
Hong et al.

(10) Patent No.: US 7,314,314 B2
(45) Date of Patent: Jan. 1, 2008

(54) OIL RETAINING STRUCTURE OF A SPINDLE

(75) Inventors: Alex Hong, Kaohsiung (TW); Kuo Hsiang Chen, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 190 days.

(21) Appl. No.: 11/215,036

(22) Filed: Aug. 31, 2005

(65) Prior Publication Data

US 2006/0083452 A1     Apr. 20, 2006

(30) Foreign Application Priority Data

Oct. 14, 2004    (TW) ................................ 93131130 A

(51) Int. Cl.
*F16C 33/10*    (2006.01)
(52) U.S. Cl. ...................................... 384/292; 384/114
(58) Field of Classification Search ................ 384/292, 384/291, 100, 107, 114; 310/90; 360/99.08, 360/98.07; 417/354, 423.12, 412.13
See application file for complete search history.

(56) References Cited

U.S. PATENT DOCUMENTS

| 1,856,304 A | * | 5/1932 | Whiteley ..................... 384/291 |
| 6,626,577 B1 | * | 9/2003 | Horng et al. ................ 384/114 |
| 2005/0001495 A1 | * | 1/2005 | Takahashi et al. ............ 310/90 |

\* cited by examiner

*Primary Examiner*—Thomas R. Hannon
(74) *Attorney, Agent, or Firm*—Bacon & Thomas, PLLC

(57) ABSTRACT

This invention relates to an oil retaining structure of a spindle, wherein the outer peripheral surface of the spindle is provided with a first oil groove extending spirally along a clockwise direction and a second oil groove extending spirally along a counterclockwise direction. The first oil groove and the second oil groove across each other so as to form a plurality of collecting points. In operation, the oil film formed on the outer peripheral surface of the spindle will collect in the two oil grooves slowly, and the lubricating oil in the two oil grooves will bump into each other at the collecting points and then diffuse. As a result, an interior cycle is formed, which not only prevents the leaking of the lubricating oil but also makes the lubricating oil distribute evenly on the surface of the spindle.

5 Claims, 4 Drawing Sheets

OIL RETAINING STRUCTURE OF A SPINDLE

FIELD OF INVENTION

This invention is related to an oil retaining structure of a spindle, in particular to a structure that can retain the lubricating oil on a spindle of a spindle motor for a disc drive or an optical disc drive so as to prevent the lubricating oil from leaking out, avoid wear of spindle and bearing, reduce noise, and extend operation life of the spindle motor.

BACKGROUND OF INVENTION

Lubricating oil is used for providing the lubrication between a spindle and a bearing when the spindle is rotating so as to reduce the wear caused by friction. Therefore, how to prevent the lubricating oil from leaking out is a primary topic in improving friction wear.

Conventionally, the way to prevent the lubricating oil from leaking out is to dispose an oil seal or pad on the two ends of the bearing having oil respectively. However, such way only can achieve a limited effect because when the spindle rotates at high speed, the lubricating oil moves upward continuously according to the rotation of the spindle, then exudes out from the gap between the spindle and the oil seal or pad, and finally slips off the spindle due to the centrifugal force caused by the rotation of the spindle. Therefore, such way only can block the lubricating oil from leaking out passively, but can not retain the lubricating oil actively. To improve the above-mentioned shortcoming, an oil retaining structure of a spindle is disclosed in ROC (Taiwan) Patent Publication No. 573710 entitled "Improved Spindle", as shown in FIG. 1.

Referring to FIG. 1, a spindle 10 is provided with a plurality of annular grooves 11 that are perpendicular to the axial direction thereof. A plurality of oil retaining gaps are formed between the inner wall of the bearing 12 and the spindle 10. When the spindle 10 rotates, the oil retaining gaps are filled with the lubricating oil that provides the lubrication between the spindle 10 and the bearing 12.

Although the above-mentioned oil retaining structure can provide the lubrication between the spindle 10 and the bearing 12 having oil, it can not completely prevent the lubricating oil from leaking out. The reason is that when the spindle 10 rotates at high speed, the lubricating permeates into the gaps between the bearing 12 and the portion that are not the oil retaining gaps of the spindle 10 due to the capillary action, which forms a thin oil film that moves upwardly according to the rotation of the spindle 10, then exudes out from the gap between the top end of the spindle 10 and the oil seal or pad, and finally slips off the spindle 10 due to the centrifugal force caused by the rotation of the spindle 10. Accordingly, the above-mentioned oil retaining structure only can delay the speed of the lubricating oil leaks.

Consequently, there is a need for a new oil retaining structure that not only improves the above-mentioned problem of leaking of the lubricating oil but also makes the lubricating oil distribute evenly on the spindle so as to avoid wear of the spindle and the bearing, reduce noise, and extend operation life of the spindle motor.

SUMMARY OF INVENTION

It is a primary object of this invention to provide an oil retaining structure of a spindle, wherein the outer peripheral surface of the spindle is provided with a first oil groove extending spirally along a clockwise direction and a second oil groove extending spirally along a counterclockwise direction. The first oil groove and the second oil groove across each other so as to form a plurality of collecting points. When the invention is applied to a disc drive or an optical disc drive, the oil film formed on the outer peripheral surface of the spindle will collect in the two oil grooves slowly, and the lubricating oil in the two oil grooves will bump into each other at the collecting points and then diffuse. As a result, the lubrication system of the central structure forms an interior cycle by utilizing the two oil grooves that not only improves the leaking of the lubricating oil but also makes the lubricating oil distribute evenly on the surface of the spindle so as to avoid wear of the spindle and the bearing, reduce noise, and extend operation life of the spindle motor.

DETAILED DESCRIPTIONS OF THE INVENTION

Figure 1:
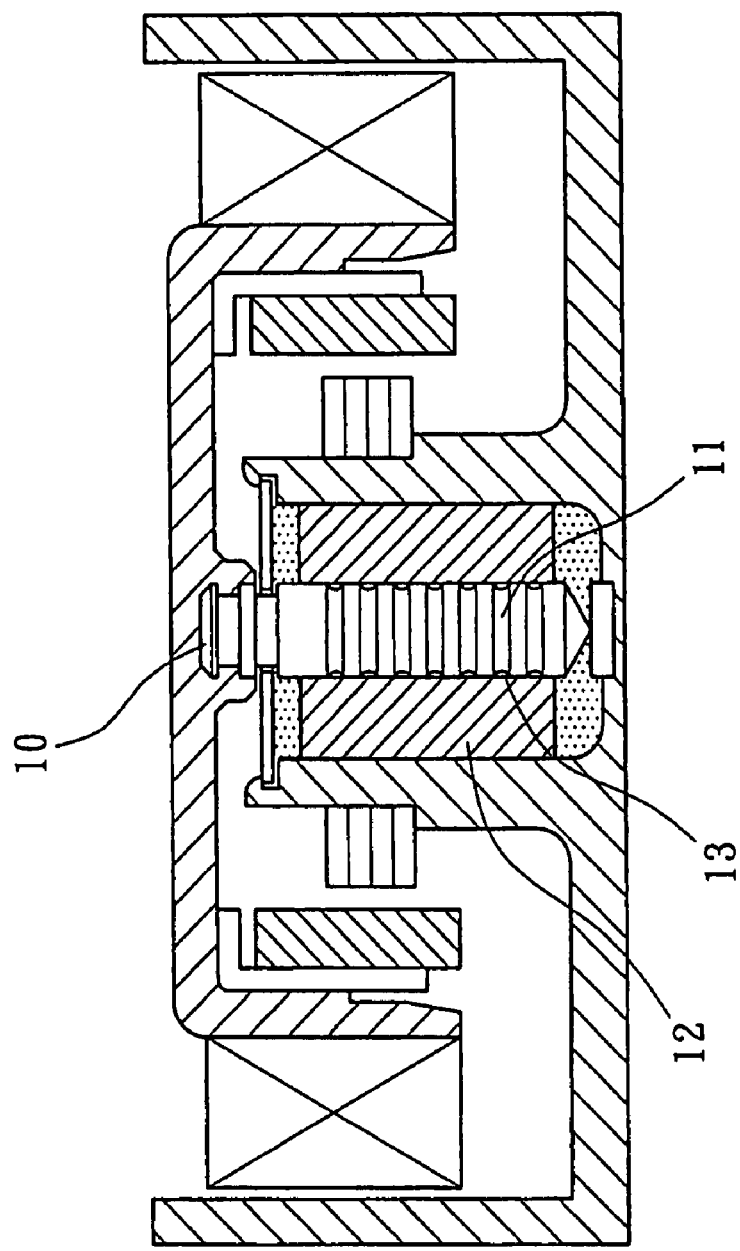
FIG. 1 is a cross-sectional view showing the embodiment of ROC (Taiwan) Patent Publication No. 573710 entitled "Improved Spindle"
Figure 2A:
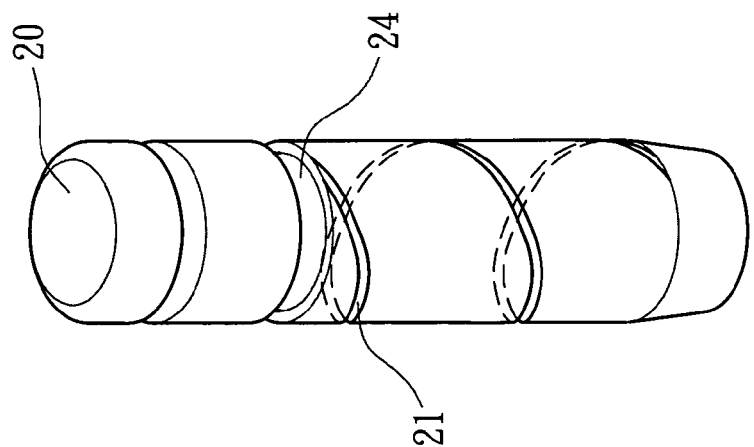
FIG. 2A is a perspective view showing a spindle of this invention, wherein the spindle has an oil groove extending spirally along a clockwise direction.
Figure 2B:
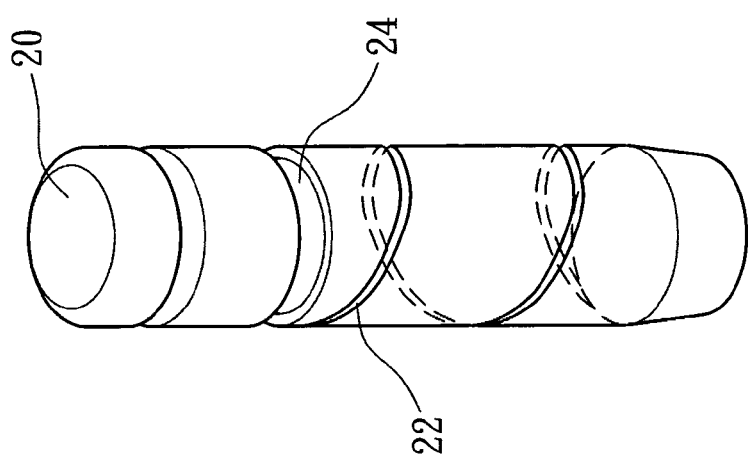
FIG. 2B is a perspective view showing a spindle of this invention, wherein the spindle has an oil groove extending spirally along a counterclockwise direction.
Figure 2C:
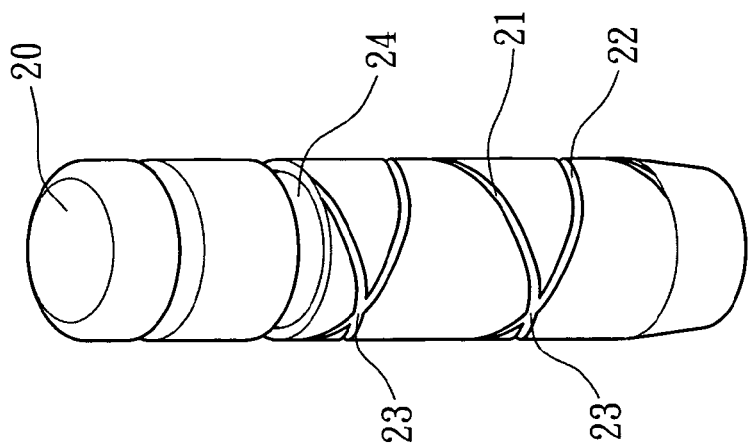
FIG. 2C is a perspective view showing a spindle of this invention, wherein the spindle has two oil grooves.

Referring to FIGS. 2A to 2C, this invention relates to an oil retaining structure of a spindle 20, wherein the spindle 20 penetrates a through hole of a bearing 44 (FIG. 3) having oil and rotates in the bearing 44 having oil.

The oil retaining structure of the spindle 20 includes a first oil groove 21 extending spirally along a clockwise direction and a second oil groove 22 extending spirally along a counterclockwise direction.

As shown in FIG. 2A, the first oil groove 21 extending spirally along a clockwise direction is disposed on the outer peripheral surface of the spindle 20. As shown in FIG. 2B, the second oil groove 22 extending spirally along a counterclockwise direction is also disposed on the outer peripheral surface of the spindle 20.

Therefore, as shown in FIG. 2C, in the invention, the first oil groove 21 and the second oil groove 22 with opposite spiral directions across each other so as to form a plurality of collecting points 23. The oil film that spirals upward continuously in the prior art will collect in the first oil groove 21 and the second oil groove 22, and the flowing of the oil film will slow down. Additionally, the lubricating oil in the first oil groove 21 and the second oil groove 22 will bump into each other at the collecting points 23 and then diffuse. As a result, the flowing of the oil film will slow down again, and the lubricating oil after bumping will diffuse outwardly and downwardly, which not only improves the leaking of the lubricating oil but also makes the lubricating oil distribute evenly on the surface of the spindle 20.

A preferred embodiment accompanied with the drawings is explained, in details, as follows so as to clearly disclose this invention applied to a spindle motor for a disc drive or an optical disc drive.

Figure 3:
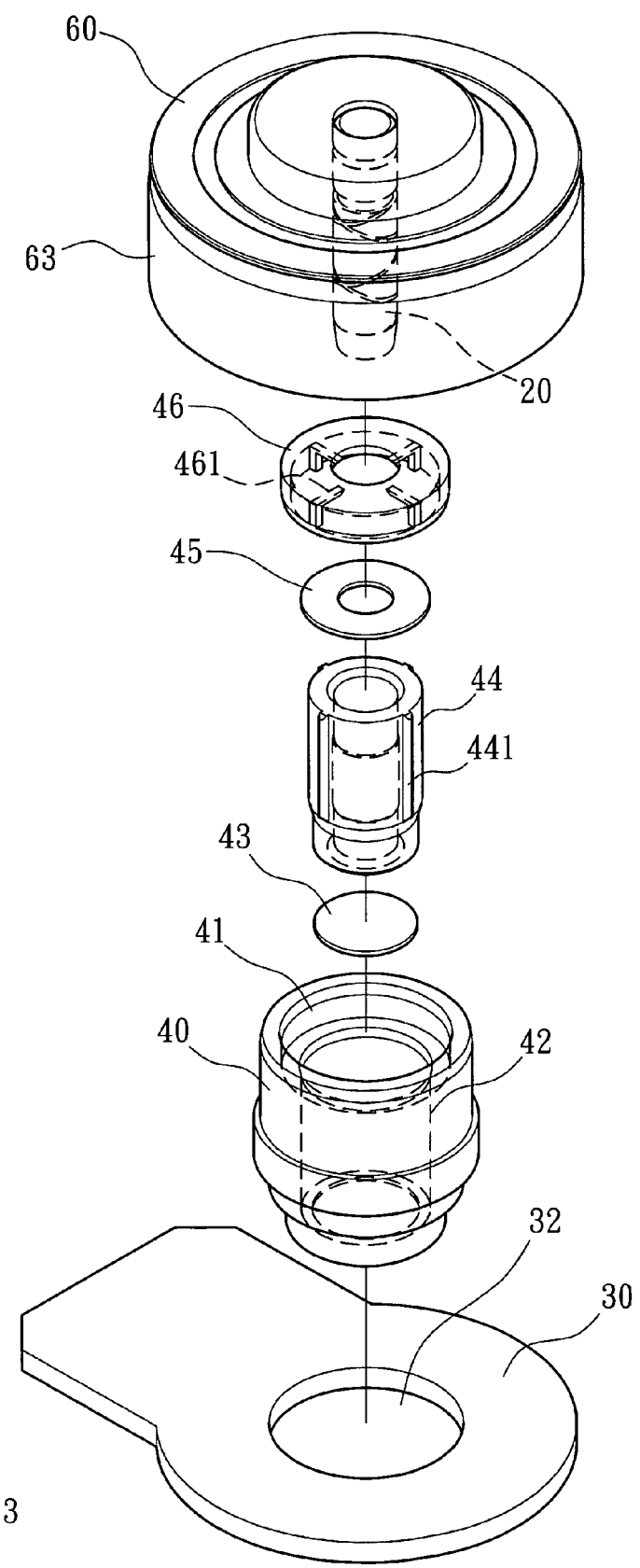
FIG. 3 is a perspective, exploded view showing this invention applied to a spindle motor.
Figure 4:
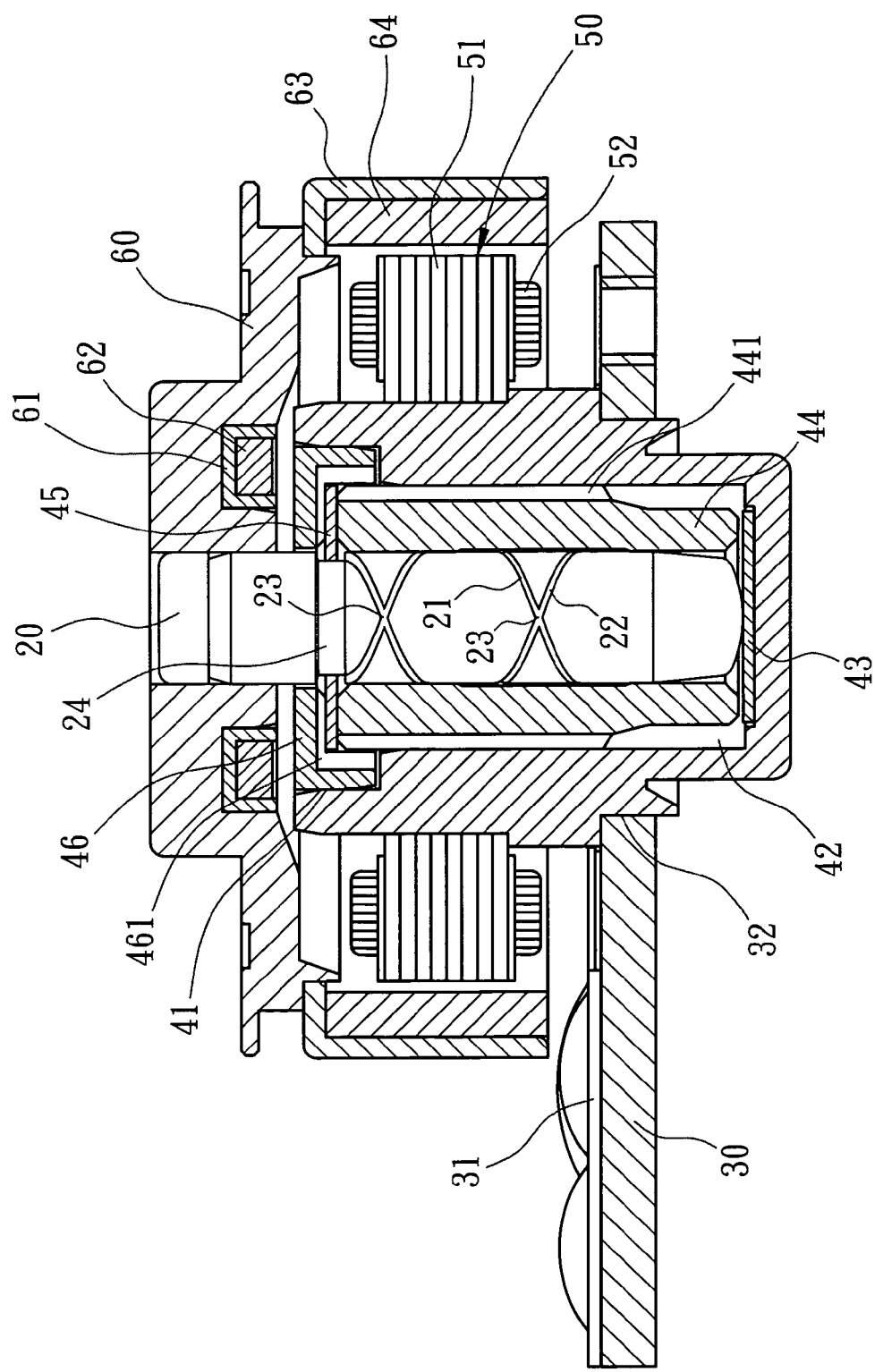
FIG. 4 is a perspective, assembled view showing this invention applied to a spindle motor.

Referring to FIGS. 3 and 4, the spindle motor mainly comprises a mounting member 30, a metal tube 40, a stator 50 and a turntable 60.

The mounting member 30 is mounted with a printed circuit board 31 thereon, and the mounting member 30 has a through hole 32 for receiving the metal tube 40.

The metal tube 40 has a one-way opening on the top thereof and an upper accommodating chamber 41 and a lower accommodating chamber 42 in the interior thereof.

The stator 50 includes a plurality of silicon-steel plates 51 each coiled with a coil 52, and is affixed on the outer peripheral surface of the metal tube 40.

The spindle 20 is inserted and affixed at a center of the turntable 60. The turntable 60 has a motor housing 63 on the bottom surface around the circumference thereof. The motor housing 63 has a ring-shaped magnet 64 on the inner surface thereof. Further, a turntable magnet 62 enclosed by an insulation ring 61 is disposed on the bottom surface of the turntable 60 around the circumference of the spindle 20.

To assemble, the metal tube 40 is affixed in the through hole 32 of the mounting member 30, and the stator 50 is affixed on the outer peripheral surface of the metal tube 40. A friction plate 43 and the bearing 44 having oil are disposed in the lower accommodating chamber 42 in sequence. The outer peripheral surface of the bearing 44 is provided with a plurality of projecting ribs 441 that extend axially so as to form a gap between the outer peripheral surface of the bearing 44 and the inner side wall of the lower accommodating chamber 42. Further, the bearing 44 has a locking ring 45 on the upper end thereof, and the locking ring 45 is fastened with an upper lid 46 so that the upper end of the bearing 44 is affixed in the upper accommodating chamber 41. The inner surface of the upper lid 46 is provided with a plurality of sustaining protrusions 461 that extend radially, and the sustaining protrusions 461 press the locking ring 45 tightly as to form a gap between the upper lid 46, the locking ring 45 and the bearing 44. The spindle 20 that is affixed to the turntable 60 penetrates and in a through hole of the bearing 44 having oil, wherein the outer peripheral surface of the spindle 20 is provided with the first oil groove 21 and the second oil groove 22 that spiral along opposite directions and across each other so as to form a plurality of the collecting points 23. The bottom end of the spindle 20 urges against the friction plate 43, and has an annular groove 24 to be locked by the locking ring 45.

As such, when the spindle 20 rotates at high speed, the oil film that is formed on the outer peripheral surface of the spindle 20 and spirals upward continuously in the prior art will collect in the first oil groove 21 and the second oil groove 22 slowly. Additionally, the lubricating oil in the first oil groove 21 and the second oil groove 22 will bump into each other at the collecting points 23 and then diffuse. As a result, the lubrication system of the central structure forms an interior cycle by utilizing the two oil grooves 21, 22 that not only improves the leaking of the lubricating oil but also makes the lubricating oil distribute evenly on the surface of the spindle 20. Besides, even few lubricating oil exudes out, it will reflow into the lower accommodating chamber 42 through the gap between the upper lid 46, the locking ring 45 and the bearing 44, and the gap between the outer peripheral surface of the bearing 44 and the inner side wall of the lower accommodating chamber 42 so as to achieve the effect of completely preventing the lubricating oil from leaking out.

From the invention thus described, it will be obvious that this invention as described above is provided for explanation and that the invention may be varied in many ways, where such variations are not to be regarded as departing from the spirit and scope of the invention, and all such modifications as would be obvious to one skilled in the art are intended for inclusion within the scope of the following claims.

What is claimed is:

1. An oil retaining structure of a spindle, comprising a spindle penetrating and rotating in a through hole of a bearing having oil, wherein the outer peripheral surface of the spindle is provided with a first oil groove extending spirally along a clockwise direction and a second oil groove extending spirally along a counterclockwise direction, the first oil groove and the second oil groove across each other so as to form a plurality of collecting points;

wherein the bearing is disposed in a spindle motor that comprises a metal tube, a stator and a turntable, the metal tube has a one-way opening on the top thereof and an upper accommodating chamber and a lower accommodating chamber in the interior thereof, the bearing is disposed in the lower accommodating chamber and has a locking ring on the upper end thereof, the locking ring is fastened with an upper lid so that the upper end of the bearing is affixed in the upper accommodating chamber, the stator is affixed on the outer peripheral surface of the metal tube, the spindle is inserted and affixed at a center of the turntable, and has an annular groove to be locked by the locking ring, the turntable has a motor housing on the bottom surface around the circumference thereof, the motor housing has a ring-shaped magnet on the inner surface thereof.

2. The oil retaining structure of a spindle of claim 1, further comprising a friction plate disposed under the bearing, wherein the friction plate is urged by the bottom end of the spindle.

3. The oil retaining structure of a spindle of claim 1, wherein the outer peripheral surface of the bearing is provided with a plurality of projecting ribs extending axially so as to form a gap between the outer peripheral surface of the bearing and the inner side wall of the lower accommodating chamber, the inner surface of the upper lid is provided with a plurality of sustaining protrusions extending radially, the sustaining protrusions press the locking ring tightly as to form a gap between the upper lid, the locking ring and the bearing.

4. The oil retaining structure of a spindle of claim 1, wherein the spindle motor further comprises a mounting member on which a printed circuit board is mounted, and the mounting member has a through hole for receiving the metal tube.

5. The oil retaining structure of a spindle of claim 1, further comprising a turntable magnet enclosed by an insulation ring and disposed on the bottom surface of the turntable around the circumference of the spindle.

* * * * *